United States Patent
Abushawashi et al.

(10) Patent No.: US 10,710,531 B2
(45) Date of Patent: Jul. 14, 2020

(54) PLASTICALLY DEFORMABLE SHOCK ABSORBER

(71) Applicant: Ford Global Technologies, LLC, Dearborn, MI (US)

(72) Inventors: Yalla Abushawashi, Canton, MI (US); Marwan Elbkaily, Canton, MI (US); Tushar Kamble, Farmington, MI (US); Abdelrahim Khal, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 16 days.

(21) Appl. No.: 15/840,383

(22) Filed: Dec. 13, 2017

(65) Prior Publication Data

US 2019/0176733 A1    Jun. 13, 2019

(51) Int. Cl.
| | |
|---|---|
| *B60R 19/34* | (2006.01) |
| *F16F 7/14* | (2006.01) |
| *F16F 7/00* | (2006.01) |
| *B62D 21/15* | (2006.01) |
| *B60R 19/42* | (2006.01) |
| *F16F 7/12* | (2006.01) |

(52) U.S. Cl.
CPC .............. *B60R 19/34* (2013.01); *B60R 19/42* (2013.01); *B62D 21/157* (2013.01); *F16F 7/003* (2013.01); *F16F 7/12* (2013.01); *F16F 7/128* (2013.01); *F16F 7/14* (2013.01)

(58) Field of Classification Search
CPC ...... F16F 7/14; F16F 7/12; F16F 7/003; F16F 7/128; B60R 19/42; B60R 19/34; B62D 21/157

USPC .................................................... 296/187.12
See application file for complete search history.

(56) References Cited

U.S. PATENT DOCUMENTS

| | | | |
|---|---|---|---|
| 5,449,151 A | 9/1995 | Johnson | |
| 5,482,258 A | 1/1996 | Clauson | |
| 6,135,251 A * | 10/2000 | Hartlieb | B60R 19/34 188/371 |
| 6,854,574 B2 * | 2/2005 | Yoshida | F16F 7/125 188/371 |
| 9,227,094 B2 * | 1/2016 | Poldmaa | E04G 21/328 |
| 9,539,947 B1 | 1/2017 | Jensen et al. | |
| 9,623,823 B2 | 4/2017 | Vermeys et al. | |
| 2003/0006575 A1 | 1/2003 | Genis et al. | |
| 2009/0133977 A1 | 5/2009 | Warren | |

FOREIGN PATENT DOCUMENTS

JP     2003090376     3/2003

* cited by examiner

*Primary Examiner* — Joseph D. Pape
*Assistant Examiner* — Dana D Ivey
(74) *Attorney, Agent, or Firm* — David Coppiellie; Carlson, Gaskey & Olds, P.C.

(57) ABSTRACT

A shock absorber system includes a body, a component, and at least one primary attachment that secures the component on the body. A secondary attachment is configured to secure the component to the body upon breakage of the primary attachment. The secondary attachment includes a single-use shock absorber and a cable that is attached to the body and secured through the single-use shock absorber to the component.

13 Claims, 2 Drawing Sheets

PLASTICALLY DEFORMABLE SHOCK ABSORBER

BACKGROUND

Tethers are known and used to retain components to a vehicle.

Shock absorbers are designed to reduce peak forces. Typically, shock absorbers are robustly designed for repeated, cyclic use. This adds size, weight, design complexity, and cost to the shock absorber, making it unfeasible in a single-use scenario.

SUMMARY

A shock absorber system according to an example of the present disclosure includes a body, a component, and at least one primary attachment that secures the component on the body. A secondary attachment is configured to secure the component to the body upon breakage of the primary attachment. The secondary attachment includes a single-use shock absorber and a cable that is attached to the body and secured through the single-use shock absorber to the component.

A single-use shock absorber according to an example of the present disclosure includes first and second connector sections and a shock absorber element that joins the first and second connector sections. The shock absorber element is plastically deformable, without breaking, at a preset design load applied in tension to the first and second connector sections.

A single-use shock absorber according to another example of the present disclosure includes first and second connector sections and a serpentine shock absorber element that joins the first and second connector sections. The serpentine shock absorber element is plastically deformable, without breaking, at a preset design load applied in tension to the first and second connector sections.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
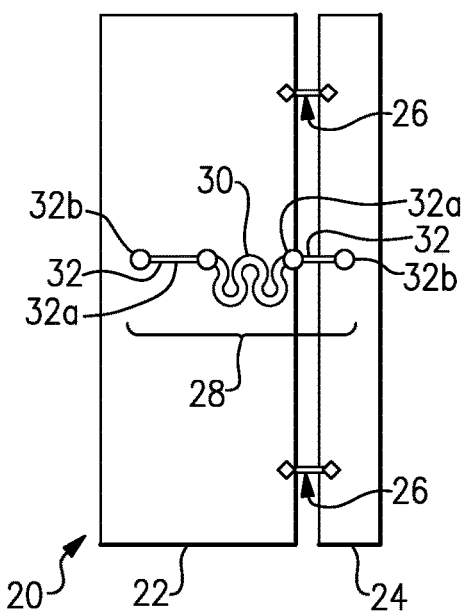
FIG. 1 illustrates an example shock absorber system, in an initial state prior to breakage of a primary attachment of a component.

FIG. 1 illustrates an example of a shock absorber system 20. In this example, the shock absorber system 20 is shown schematically in the environment of a vehicle; however, it is to be understood that the examples herein are not limited to vehicles and may also be used or adapted to other systems where there are high dynamic forces and that would be accepting of a single-use design.

The system 20 generally includes a body 22, such as a vehicle body, and a component 24. In the example of a vehicle, the component 24 may be a running board that is secured on the exterior of the vehicle. There is at least one primary attachment 26 (two shown) that secures the component 24 on the body 22. For instance, the primary attachment 26 is a mechanical connection that serves to secure the component 24 on the body 22 in its intended functional position.

The system 20 further includes a secondary attachment 28 that is configured to secure the component 24 to the body 22 upon breakage of the primary attachment(s) 26. The breakage may be from a vehicle crash, for example. Until such breakage, the secondary attachment 28 does not serve to secure, attach, or support the component 24 on the body 22. It is only after breakage of the primary attachment(s) 26 that the secondary attachment 28 serves an active role in securing the component 24 to the body 22. Upon such breakage, the primary attachment(s) 26 are no longer able to support the component 24 in its functional position. As a result, the component 24 may release and move from its functional position. It is at this time that the secondary attachment 28 then secures the component 24, thereby preventing the component 24 from being thrown from the body 22.

To serve this purpose, the secondary attachment 28 includes a single-use shock absorber 30 (hereafter "shock absorber") and one or more cables 32, such as metal cables. As used herein, "single-use" refers to the shock absorber being configured in such a way that one, initial employment of it in service of its primary purpose causes it permanent deformation, rendering it incapable of performing similarly if employed for the primary purpose a second time.

In the secondary attachment 28 each cable 32 is secured at one of its sections to the shock absorber 30, as represented at 32a and is secured at its opposing end to the body 22 or the component 24, respectively, as represented at 32b. As will be appreciated, rather than two of the cables 32, a single cable may be used and one end of the shock absorber 30 may be directly connected to either the body 22 or the component 24. In further examples, there may also be other parts intermediate the shock absorber 30 and either the body 22 or the component 24 which substantially transmit the force of the component 24 upon release from the body 22.

The depiction of the system 20 in FIG. 1 represents an initial state before breakage of the primary attachment(s) 26. In this state, the primary attachment(s) 26 are solely responsible for securing the component 24 on the body 22. As discussed, the secondary attachment 28 does not serve in this state to secure the component 24 to the body 22.

Figure 2:
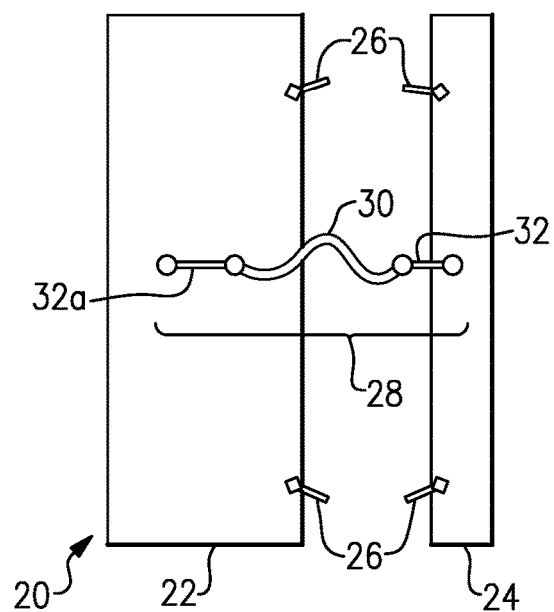
FIG. 2 illustrates the shock absorber system of FIG. 1, but in a second state, after breakage of the primary attachment.

FIG. 2 depicts the same system 20, but in a second state, after breakage of the primary attachment(s) 26. Upon breaking, the component 24 is temporarily released from the body 22. On separation of the component 24 from the body 22, the secondary attachment 28 bears the load of the component 24, which in a crash or similar event may take place over a relatively short period of time of a few milliseconds. This results in high forces applied to the secondary attachment 28. If there were only a cable in this situation to tether the component to the body, the thickness of the cable would need to be selected so that the cable could withstand the high peak force without breaking. This would result in a thick cable that adds weight and cost to the vehicle.

The shock absorber 30 serves to lower the peak force in comparison to using only a cable. In this regard, the force transmitted to the secondary attachment 28 causes the shock absorber 30 to plastically deform. Plastic deformation refers to deformation which, unlike elastic deformation, is unrecoverable once the force ceases. In other words, the deformation is permanent. The deformation absorbs energy and thereby lowers the force experienced by the cable(s) 32. The lower peak force on the cable(s) 32 permits the cable(s) 32 to be thinner than they would need to be in absence of the shock absorber 30.

Figure 3:
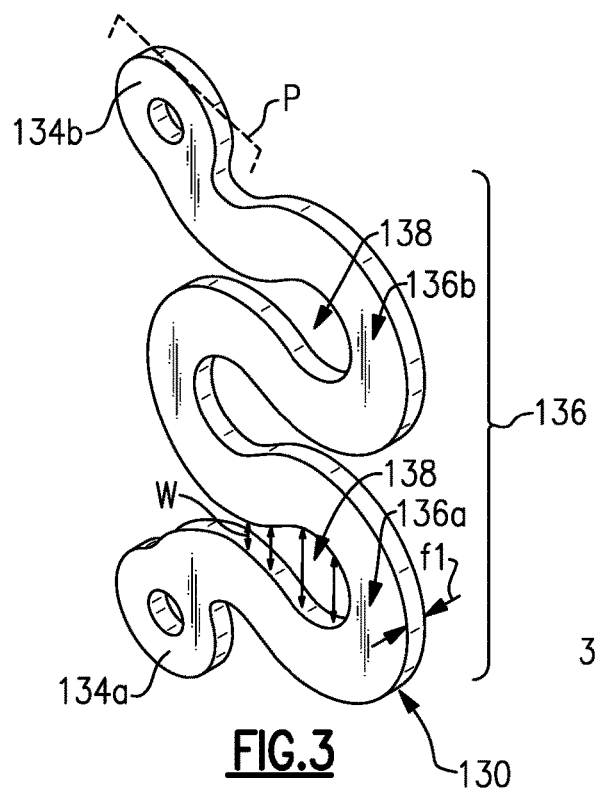
FIG. 3 illustrates an example single-use shock absorber.

FIG. 3 illustrates an example of a single-use shock absorber 130 that may be used in the secondary attachment 28 above. In this disclosure, like reference numerals designate like elements where appropriate and reference numerals with the addition of one-hundred or multiples thereof designate modified elements that are understood to incorporate the same features and benefits of the corresponding elements. In this example, the shock absorber 130 includes first and second connector sections 134a/134b and a shock absorber element 136 that joins the first and second connector sections 134a/134b. The connector sections 134a/134b in this example have orifices for connecting to cables 32, the body 22, or the component 24. As will be appreciated, one or both of the connector sections 134a/134b could be configured differently for a different type of connection.

In this example, the shock absorber element 136 is a serpentine shock absorber element. In this regard, the shock absorber element 136 includes rounded windings or sections 136a/136b that form gaps 138. In this example, the gaps 138 have a diverging gap width, W. The divergence is relative to the direction going into the winding or bend. The gap width W widens going into each of the windings 136a/136b, from width W1 to W2 to W3, such that W1<W2<W3. The serpentine shape and the diverging gap width facilitate high energy absorption and also provide the ability to tailor the absorption. For instance, the number of windings and diverging gaps determine, at least in part, the amount of material in the shock absorber element 136 and thus the energy absorption capacity of the shock absorber element 136.

In this example, the shock absorber 130 has a planar design. For instance, the shock absorber 130 has a thickness, t1, that is uniform throughout the shock absorber 130. Moreover, the connector sections 134a/134b and shock absorber element 136 lie in the same plane, represented at P (i.e., are co-planar), and are easily accessible for connection. For instance, the shock absorber element 136 is fully inboard of the first and second connector sections 134a/134b. The connector sections 134a/134b can thus be accessed from the outboard direction, meaning the shock absorber element 136 does not hinder access to the connector sections 134a/134b. The co-planar design and uniform thickness provide a low-profile configuration.

The shock absorber element 136 is plastically deformable, without breaking, at a preset design load that is applied in tension to the first and second connector sections 134a/134b. For instance, if a tension load is applied to the connector sections 134a/134b to pull the sections 134a/134b apart, at the preset design load the shock absorber element 136 will plastically deform and "stretch."

The preset design load is determined primarily by the type of material from which the shock absorber element 136 is made, how much material is in the shock absorber element 136, and the geometry of the shock absorber element 136. These factors can be tailored in an engineering phase to set the preset design load at a level that corresponds to the peak loads that would be applied from release of the component 24. For instance, if testing or simulation shows that the peak load from release would be 25 kN, the preset design load at which plastic deformation occurs should be below 25 kN, otherwise the shock absorber element 136 would not plastically deform. As will be appreciated, if the preset design load were too far below the peak load, the peak load would exceed the breaking limit of the shock absorber. Thus, the preset design load must be somewhere within these limits. Given this disclosure, one of ordinary skill in the art will be able to determine such limits through physical experiment and/or computer simulation.

The shock absorber 130 has no moving parts and is of relatively simple geometry, which facilitates greater reliability and inexpensive fabrication. As an example, the shock absorber 130 can be formed as a single, monolithic piece, or even a limited number of pieces that are bonded or fastened together. Most typically, the shock absorber 130 will be formed of a metal alloy, although if the peak forces are low enough, polymer composites may be used. Examples metal alloys may include, but are not limited to, aluminum alloys and steel alloys.

Figure 4:
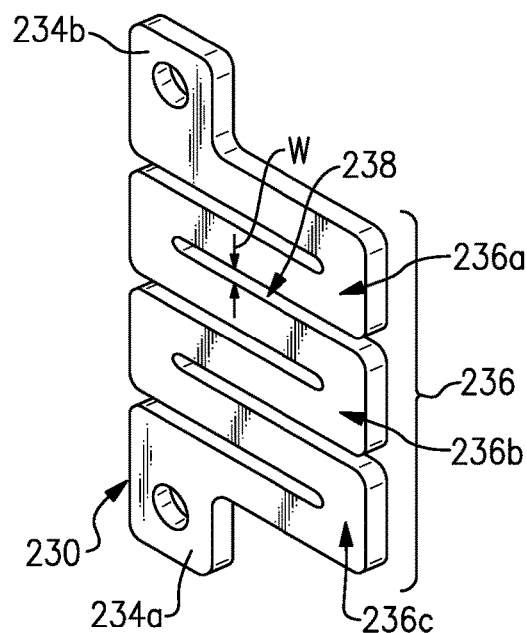
FIG. 4 illustrates another example single-use shock absorber.

FIG. 4 illustrates another example single-use shock absorber 230. Similar to the shock absorber 130, the shock absorber 230 has a serpentine shape, first and second connector sections 234a/234b, a shock absorbing element 236, and a planar design. However, the shock absorber 230 in this example has three windings 236a/236b/236c instead of two as in the shock absorber 130, and also the gaps 238 are of constant width W. The gaps 238 of constant width, along with a less rounded geometry, cause higher stress concentrations on the windings 236a/236b/236c, which may tend to focus the load rather than more evenly distributing the load as the rounded and diverging shape of the shock absorber 130 would. Thus, the number and shape of the windings in the shock absorbers herein may be modified at an engineering stage in order to tailor the preset design load at which the shock absorber plastically deforms without breaking at a given applied load or load range.

Figure 5:
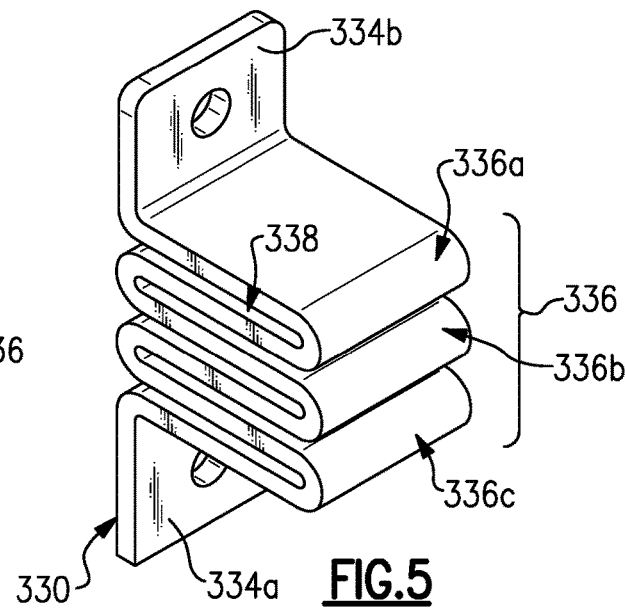
FIG. 5 illustrates another example single-use shock absorber.

FIG. 5 illustrates another example single-use shock absorber 330. The shock absorber 330 in this example also has a serpentine shape, first and second connector sections 334a/334b, a shock absorbing element 336, and windings 336a/336b/336c spaced by gaps 338, but not the planar design as in the shock absorbers 130/230. Rather, the windings 336a/336b/336c extend out-of-plane relative to the first and second connector sections 334a/334b, which are co-planar in this example. Although not low-profile, the out-of-plane shape is compact. Thus, the spatial envelope of the shock absorbers herein can also be tailored, to modify the preset design load at which the shock absorber plastically deforms, to fit a given design space, or both.

Figure 6:
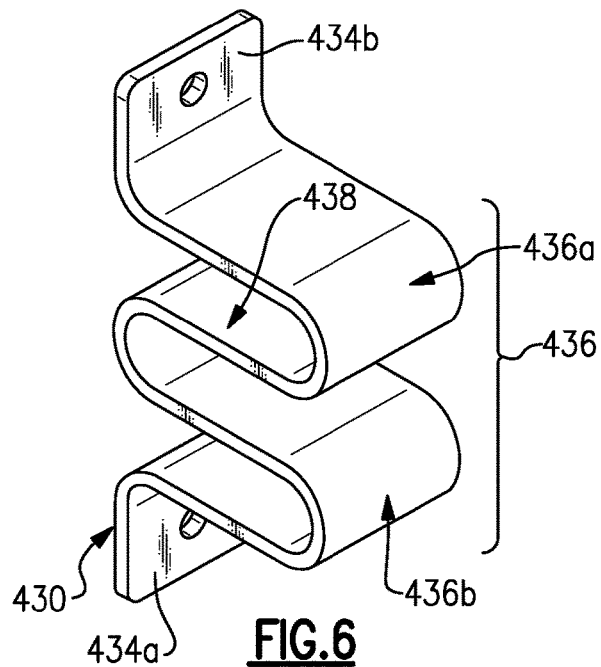
FIG. 6 illustrates another example single-use shock absorber.

FIG. 6 illustrates another example single-use shock absorber 430. The shock absorber 430 is similar to the shock absorber 330 in that it also has a serpentine shape, first and second connector sections 434a/434b, and a shock absorber element 436. However, the shock absorber element 436 has only two windings 436a/436b and larger gaps 438 in order to provide a different preset design load at which the shock absorber 430 will plastically deform.

Figure 7A:
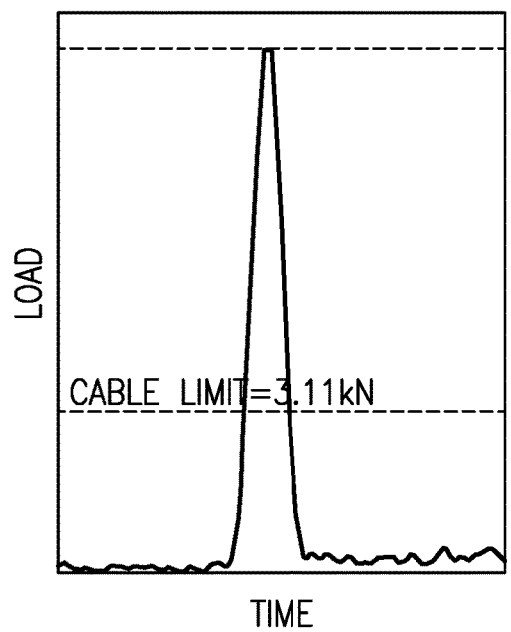
FIGS. 7A and 7B graphically depict test simulations
Figure 7B:
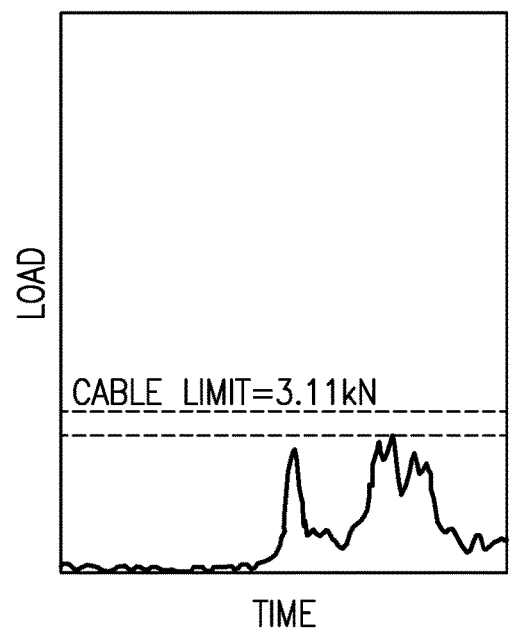

FIGS. 7A and 7B graphically depict test simulations to demonstrate the effect of the shock absorbers described herein. FIG. 7A represents a simulation on only a cable, and FIG. 7B represents a simulation on the same cable but with an attached shock absorber according to this disclosure. In the simulations, an effective mass representative of the component 24 (e.g., a running board) was attached and initial speed was imposed while measuring load over time. The graphs thus show load on the y-axis versus time on the x-axis. The horizontal dashed line on the graphs represents the breaking limit of the cable (or a target peak force limit to meet performance criteria). In the simulation represented in FIG. 7A, the peak load far exceeds the breaking limit, indicating that a much thicker cable would be needed to bear the load. In the simulation represented in FIG. 7B, with the shock absorber, the peak load is below the breaking limit of the cable. The lower peak load is due to the absorption of energy by the shock absorber. And because the peak load is below the breaking limit of the cable, the thin cable need not be made thicker. Practically, there would be mass added to the system from the shock absorber, however, since the shock absorber is relatively simple and small, there can be a net reduction in mass in comparison to use of the thicker cable.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A shock absorber system comprising:
a body, a component, and at least one primary attachment securing the component on the body;
a secondary attachment configured to secure the component to the body upon breakage of the primary attachment, the secondary attachment including,
a single-use shock absorber, and
a cable attached to the body and secured through the single-use shock absorber to the component.

2. The shock absorber system as recited in claim 1, wherein the single-use shock absorber includes first and second connector sections and a shock absorber element joining the first and second connector sections, the shock absorber element being plastically deformable, without breaking, at a preset design load applied in tension to the first and second connector sections.

3. The shock absorber system as recited in claim 2, wherein the shock absorber element is of constant thickness.

4. The shock absorber system as recited in claim 2, wherein the shock absorber element is fully inboard of the first and second connector sections.

5. The shock absorber system as recited in claim 2, wherein the first and second connector sections are co-planar.

6. The shock absorber system as recited in claim 2, wherein the first and second connectors sections and the shock absorber element are a single, monolithic piece.

7. The shock absorber system as recited in claim 1, wherein the single-use shock absorber includes first and second connector sections and a serpentine shock absorber element joining the first and second connector sections, the serpentine shock absorber element being plastically deformable, without breaking, at a preset design load applied in tension to the first and second connector sections.

8. The shock absorber system as recited in claim 7, wherein the serpentine shock absorber includes windings separated by gaps that are each of constant gap width.

9. The shock absorber system as recited in claim 7, wherein the serpentine shock absorber includes windings separated by gaps that are each of diverging gap width.

10. The shock absorber system as recited in claim 1, wherein the component is a vehicle running board.

11. A single-use shock absorber comprising:
first and second connector sections;
a serpentine shock absorber element joining the first and second connector sections and having windings that are separated by gaps, the serpentine shock absorber element being plastically deformable, without breaking, at a preset design load applied in tension to the first and second connector sections, wherein the gaps widen under the preset design load applied in tension, wherein the first and second connector sections are co-planar and the serpentine shock absorber element extends out-of-plane relative to the first and second connector section.

12. The single-use shock absorber as recited in claim 11, wherein the gaps are each of constant gap width.

13. The single-use shock absorber as recited in claim 11, wherein the gaps are each of diverging gap width.

* * * * *